Feb. 25, 1941. C. SCHRAMM Re. 21,728

METHOD OF AND MEANS FOR STITCHING NECKTIES

Original Filed July 22, 1936 2 Sheets-Sheet 1

INVENTOR

Carl Schramm by Harry P. Williams

Att'y.

Feb. 25, 1941. C. SCHRAMM Re. 21,728
METHOD OF AND MEANS FOR STITCHING NECKTIES
Original Filed July 22, 1936 2 Sheets-Sheet 2
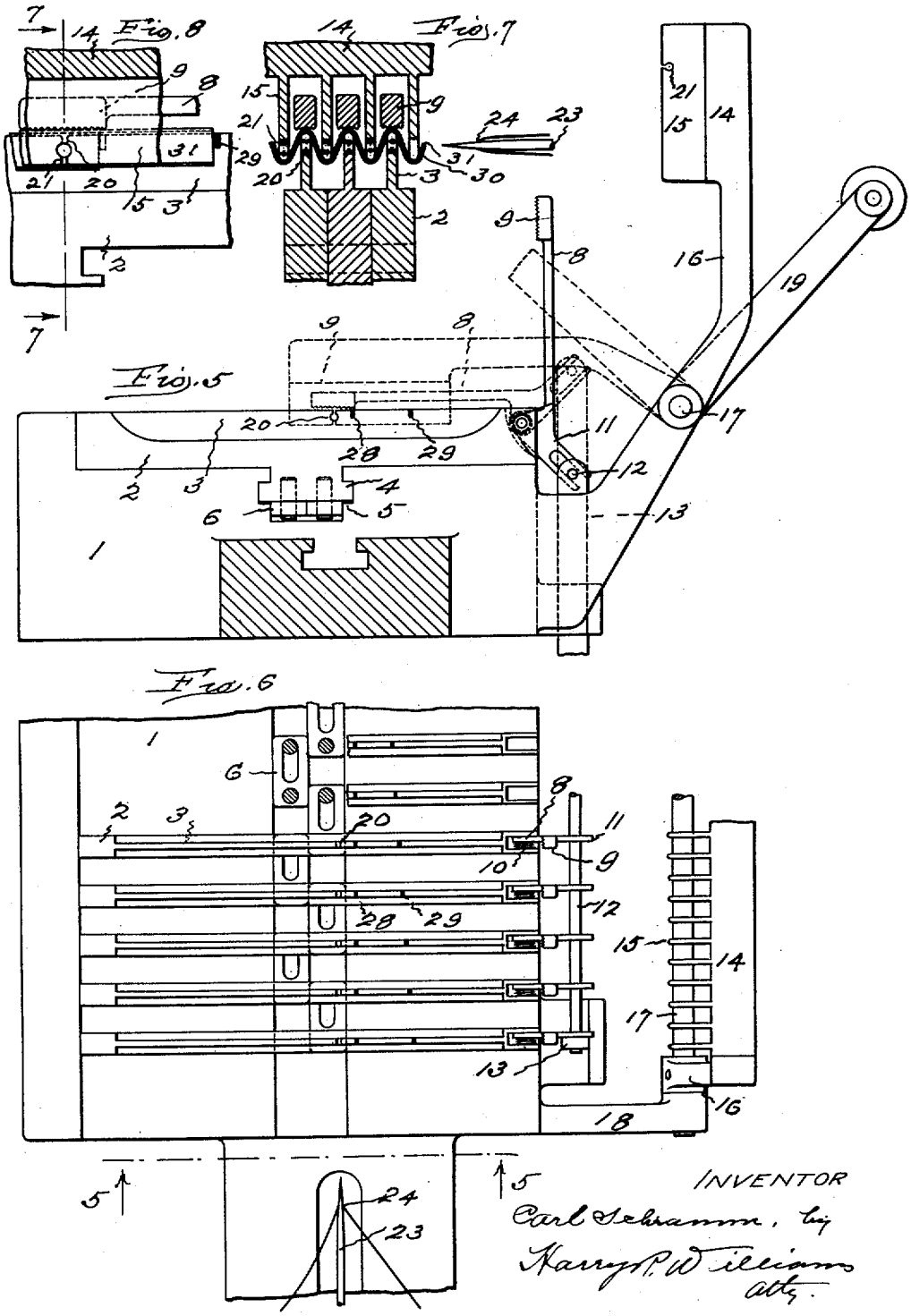
INVENTOR
Carl Schramm, by
Harry P. Williams
Atty.

Reissued Feb. 25, 1941

Re. 21,728

UNITED STATES PATENT OFFICE 21,728

METHOD OF AND MEANS FOR STITCHING NECKTIES

Carl Schramm, Hartford, Conn., assignor, by mesne assignments, to American Machine & Foundry Company, New York, N. Y., a corporation of New Jersey Original No. 2,065,754, dated December 29, 1936, Serial No. 91,853, July 22, 1936. Application for reissue December 16, 1938, Serial No. 246,210

13 Claims. (Cl. 112—174)

Neckties of the four-in-hand type customarily are composed of an outer tubular covering fabric and an inner reinforcing lining fabric. This invention relates to a method of and apparatus for simultaneously stitching together the edges of the covering fabric to form the tubular outside, and the interior lining fabric.

The object of the invention contemplates a very simple method whereby with a small and inexpensive apparatus the stitching of a cover and lining can be easily, quickly and satisfactorily accomplished.

In attaining this object the covering material is folded upon itself with the inside out and placed full length flatwise on a bed, and the lining material is laid over the free edges of the covering material. The cover and lining are then engaged at intervals and looped transversely, preferably by intermeshing the teeth of an upper comb with the teeth of a lower comb, and a threaded needle is thrust through all of the several loops at one pass. Following the withdrawal of the needle the thread is cut, leaving a thread through the loops, the cooperating looping means are disengaged, the fabric is stretched out to open the loops and finally the tie is turned inside out, so that the cover will be on the outside with its free edges stitched together and the lining stitched approximately down the middle of its length inside of the cover.

The accompanying drawings illustrate an apparatus by means of which the method may be practiced, showing the various actions of the mechanisms and the product produced thereby.

Figure 1:
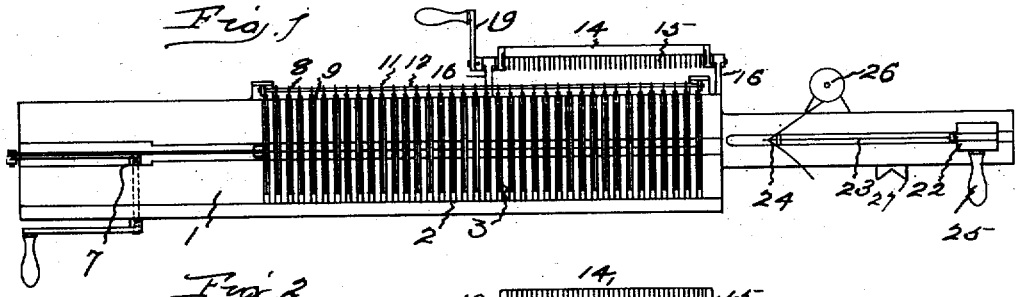
Fig. 1 shows a top plan view of the apparatus with the teeth of the upper comb raised and the teeth of the lower comb separated and in position to receive the covering and lining to be stitched.
Figure 2:
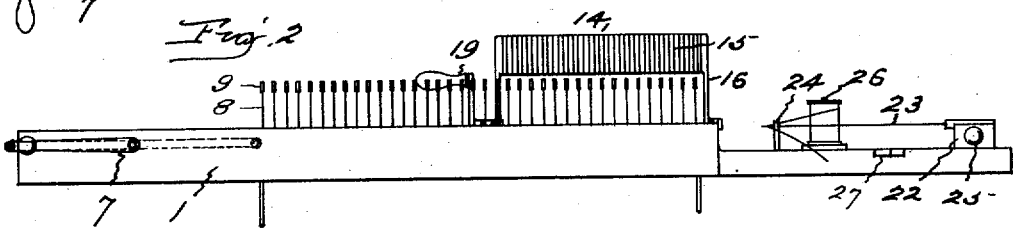
Fig. 2 shows a front elevation of the same.
Figure 3:
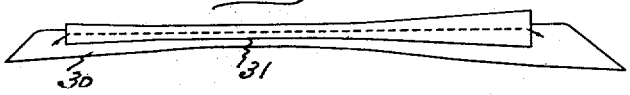
Fig. 3 shows a view of the stitched lining and covering material.
Figure 4:
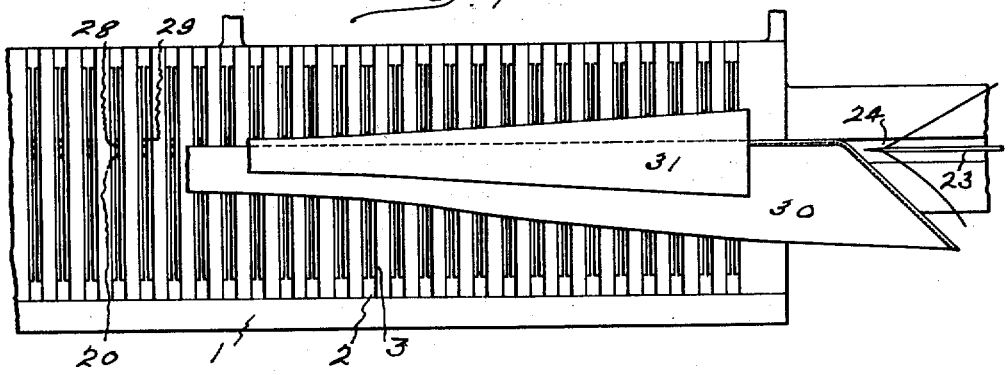
Fig. 4 shows on larger scale a top view of a portion of the needle end of the lower comb with the teeth separated and a piece of lining and piece of covering material laid thereon.

Fig. 5 on still larger scale is a vertical section taken on the dotted line 5—5 on Fig. 6, which shows a side view of a tooth of the lower comb in position to receive the fabrics, and also in full lines one of the clamps and the upper comb that cooperate with the lower comb for looping the tie fabrics, raised.

Fig. 6 is a plan view of what is illustrated in Fig. 5.

Fig. 7 is a section on the plane denoted by dotted line 7—7 on Fig. 8 showing the relative positions of the comb teeth and clamp jaws when they have acted to loop the tie fabrics, with the needle about to enter and effect the stitching.

Fig. 8 is a side view of what is shown in Fig. 7.

The apparatus illustrated for practicing the method has a bed 1 of sufficient length and width to receive a tie laid flatwise thereon. On the bed is a collapsible comb which is comprised of a plurality of separable transversely movable blocks 2 provided with teeth 3. The upper edges of the teeth are approximately flush with the upper surface of the bed, and, with the blocks, are movable transversely with relation to each other. The blocks have T-shaped tongues 4 on their under side that are slidable in a correspondingly shaped groove 5 in the bed, and they are connected together by lost motion links 6 so that they may be drawn apart to separate the teeth from each other and may be pushed together so that there are but small spaces between the teeth. The blocks may be drawn apart or may be pushed together by a lever and link mechanism 7 that may be actuated by hand or any suitable mechanism.

Pivoted to each block near its rear end, and movable transversely therewith, is a forwardly extending arm 8. The front end of the arm has a clamp jaw 9 with a roughened under surface that is adapted to be swung into engagement with or turned away from the tooth 3 of the block to which the arm is pivoted. A small spring 10 normally tends to press each jaw against its tooth with a light tension. Each arm has a rearward extension 11 with a forked end that is adapted to be engaged by a rod 12 the ends of which are supported by vertically movable slides 13 that may be drawn down at the proper time by hand or by a treadle, as desired.

Mounted on the bed so that it may be swung to and from the collapsible comb is a comb which is comprised of a bar 14 with thin teeth 15 projecting therefrom. The teeth 15 of this comb are located transversely so that they will alternate with, or mesh with, the teeth 3 of the collapsible comb when the latter comb is collapsed. The ends of the bar 14 are fastened to arms 16 that are attached to a shaft 17 which is pivotally carried by brackets 18 secured to the back of the bed. This upper comb may be swung up and down manually by a handle 19 attached to the shaft 17 or by any convenient mechanism. When the teeth 3 of the collapsible comb are drawn together and the upper comb is swung down its teeth 15 will pass into the spaces between the teeth 3. Across the upper edges of the comb teeth 3 are notches 20, and across the lower edges of the comb teeth 15 are notches 21. When the comb teeth are meshed all of these notches are aligned and form a guide for the stitching needle.

Movable transversely of the bed, near the side to which the collapsible teeth 3 are pushed to bring them together, is a slide 22 to which is attached a long needle 23 with an eye 24 near its point end. When the slide 22 is drawn out to one side, which may be accomplished manually by a handle 25 or by any convenient mechanism, the point of the needle is free from the comb teeth. With the teeth of the comb meshed together the slide may be pushed in so that the needle will pass through and be guided by the aligned notches 20 and 21 in the comb teeth.

A spindle 26 may be set on the bed near the needle slide for a spool of thread, and if desired a cutting blade 27 may be attached to the bed at this end. Across the upper surface of the fingers 3 is a line 28 and also a line 29. These lines may be formed by notching the upper surfaces of the fingers and filling the notches with material having a color that contrasts with the color of the fingers.

In using this apparatus and practicing the method, the fabric 30 that is to be the outside of the tie is folded lengthwise upon itself with the inside out, and placed full length flatwise on the bed over the collapsible comb with its free edges flush with the line 28. The lining fabric 31 is then laid over the free edges of the covering fabric with its rear edge flush with the line 29. The arms with the clamp jaws 9 are turned down so as to lightly bind the covering material and lining between the jaws and the teeth of the collapsible comb. This comb is then collapsed so that the teeth and jaws will slacken the fabric between the teeth. The comb 14 is then turned down until its teeth pass between the teeth of the collapsible comb and uniformly loop the slack fabric between the teeth. With the covering and lining held in this relation the threaded needle is thrust through the loops. As the notches in the upper comb teeth complement the notches in the lower comb teeth and form a guiding passage the needle will not flex but pass straight through the loops. After the threaded needle is thus passed through the loops the thread may be held and the needle drawn back out of the loops.

The thread is cut with ends sufficiently long to be fastened so that the thread will not be withdrawn from the loops when the stitched tie is straightened out. With the needle withdrawn the upper comb is turned up, the teeth of the lower comb and the clamp jaws are separated, and the tie is drawn out so as to flatten the loops. The lining and the covering thus stitched are turned inside out so that the covering fabric will be on the outside and the lining fabric on the inside of the seam which stitches together the free edges of the covering.

By this method and with this simple apparatus the covering and lining are stitched with one movement of the needle.

The invention claimed is:—

1. An apparatus for stitching ties which comprises a bed, a comb with transversely movable teeth mounted on the bed, transversely movable clamping jaws adapted to be engaged with said teeth, means for moving said teeth and clamping jaws toward and from each other, a comb with teeth adapted to be meshed with the teeth of the first mentioned comb, means for meshing and demeshing the teeth of the combs, a needle adapted to be moved longitudinally and passed transversely through openings in the comb teeth when they are meshed, and means for reciprocating said needle.

2. An apparatus for stitching ties which comprises a comb with teeth movable transversely toward and from each other, transversely movable clamping jaws adapted to be engaged with and to move transversely with said teeth, a comb with teeth adapted to be meshed with the teeth of the first mentioned comb, and a needle adapted to be moved longitudinally and passed transversely through openings in the comb teeth when they are meshed.

3. An apparatus for stitching ties which comprises a comb with teeth transversely movable toward and from each other, clamping jaws adapted to be swung into and out of engagement with said teeth and to move transversely therewith, a comb with teeth adapted to be swung into and out of mesh with the teeth of the first mentioned comb, and a needle adapted to be moved longitudinally and passed transversely through openings in the comb teeth when they are meshed.

4. An apparatus for stitching ties which comprises a set of transversely movable teeth, and clamps associated therewith, a set of teeth adapted to be meshed with the first mentioned teeth, and a needle adapted to be passed transversely through openings in said teeth when they are meshed.

5. The method of stitching ties which comprises folding the finished surface of a covering fabric upon itself, laying a lining fabric over the free edges of the folded covering fabric, gripping said associated covering fabric and lining fabric at intervals from opposite sides, pushing the gripped portions together and producing slack in the intervening portions, transversely stretching said slacked intervening portions and producing loops transversely of the length of the covering and lining fabrics and passing a thread through the stretched loops.

6. An apparatus for stitching ties which comprises a bed, blocks movable transversely toward and from each other longitudinally of said bed, lost motion links connecting said blocks, comb teeth mounted on and movable transversely of each other with said blocks, a comb pivotally mounted on the bed and having teeth fixed against transverse movement toward and from each other but adapted to be swung down between the teeth of the first mentioned comb when said blocks are moved together, and a needle adapted to be moved longitudinally and passed through openings in said comb teeth.

7. An apparatus for stitching ties which comprises a bed, a set of teeth movable transversely of each other along the bed, means for moving said teeth transversely toward and from each other, a set of teeth immovable transversely of each other along the bed but pivotally mounted thereon and adapted to be meshed with the first mentioned set of teeth, and a needle adapted to be passed transversely through said teeth when they are meshed.

8. An apparatus for stitching ties which comprises a bed, a set of teeth movable transversely of each other longitudinally along the bed, means for moving said teeth transversely toward and from each other, a set of teeth immovable toward and from each other pivotally mounted on the bed, and adapted to be meshed with the first mentioned teeth, said teeth having complementary notches in their edges which notches when the teeth are meshed form a needle guide, and a needle adapted to be passed transversely through said notches and to be guided by the walls thereof when the teeth are meshed.

9. An apparatus for stitching ties which comprises a set of teeth and clamping mechanism associated therewith for holding a tie on said teeth, a set of teeth arranged to mesh with said first-mentioned teeth while said tie is held thereon by said mechanism, a needle and means for effecting relative movement between said needle and teeth to pass said needle transversely through openings in said teeth when they are meshed.

10. An apparatus for stitching ties which comprises a set of teeth, a clamp movable into engagement with each of said teeth, a set of teeth constructed and arranged to mesh with the first-mentioned teeth while a tie is held thereon by said clamp, a needle, and means for effecting relative movement between said needle and teeth to pass said needle transversely through openings in said teeth when they are meshed.

11. An apparatus for stitching ties which comprises a bed, a plurality of spaced teeth mounted on said bed, clamping means movably mounted on each of said teeth for coaction therewith, a second set of teeth mounted for movement into meshing engagement with said first-mentioned teeth, and a needle adapted to be passed transversely through openings in said teeth when they are meshed.

12. An apparatus for stitching neckties which comprises a bed, a plurality of spaced teeth mounted on said bed, upon which a necktie and lining are assembled for sewing, clamps associated with said teeth for holding said lining and tie positioned thereon against movement, a second set of teeth arranged to mesh with said first-mentioned teeth to pleat said lining and tie while said lining and tie are held on said first mentioned teeth by said clamps, a needle, and means for effecting relative movement between said needle and teeth to pass said needle transversely through openings in said teeth and through said pleats when said teeth are meshed.

13. An apparatus for stitching neckties which comprises a needle, a set of teeth and clamping mechanism associated therewith, a set of teeth arranged to mesh with said first-mentioned teeth, said clamping mechanism being separate from the second-mentioned teeth and coacting with said first-mentioned set of teeth in a sequence different from the coaction between said first and second teeth, and means for effecting relative movement between said needle and teeth to pass said needle transversely through openings in said teeth when they are meshed and while said mechanism is engaged with said first-mentioned teeth.

CARL SCHRAMM.